US012596677B2

(12) United States Patent (10) Patent No.: US 12,596,677 B2

Chagani et al. (45) Date of Patent: Apr. 7, 2026

(54) STORING FILES IN BLOCKS WITHIN COMPOSITE IMAGES

(71) Applicant: Microsoft Technology Licensing, LLC, Redmond, WA (US)

(72) Inventors: Shaheed Gulamabbas Chagani, Redmond, WA (US); Aparajita Dutta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/340,229

(22) Filed: Jun. 23, 2023

(65) Prior Publication Data

US 2024/0427734 A1 Dec. 26, 2024

(51) Int. Cl.
*G06F 16/13* (2019.01)
*G06F 16/17* (2019.01)

(52) U.S. Cl.
CPC .......... *G06F 16/13* (2019.01); *G06F 16/1727* (2019.01)

(58) Field of Classification Search
CPC .............................. G06F 16/13; G06F 16/1727
See application file for complete search history.

(56) References Cited

U.S. PATENT DOCUMENTS

| | | | |
|---|---|---|---|
| 7,849,057 B1 | 12/2010 | Kazar et al. | |
| 8,504,529 B1 * | 8/2013 | Zheng ................. | G06F 11/1469 |
| | | | 707/686 |
| 9,679,007 B1 * | 6/2017 | Feldman ............. | G06F 16/2365 |

| | | | |
|---|---|---|---|
| 2016/0105310 A1 * | 4/2016 | Hill ......................... | H04L 67/10 |
| | | | 709/222 |
| 2022/0138146 A1 * | 5/2022 | Chagani ................. | G06F 16/164 |
| | | | 707/756 |
| 2023/0153105 A1 * | 5/2023 | Wesemann .............. | H04L 67/34 |
| | | | 717/168 |

FOREIGN PATENT DOCUMENTS

| | | |
|---|---|---|
| CN | 113468105 A | 10/2021 |
| WO | 2016137524 A1 | 9/2016 |

OTHER PUBLICATIONS

International Search Report and Written Opinion received for PCT Application No. PCT/US2024/033484, (MS# 413328-PCT01) mailed on Sep. 24, 2024, 13 pages.
Internationai Preliminary Report on Patentability (Chapter 1) received for PCT Application No. PCT/US2024/033484, mailed on Jan. 2, 2026, 07 pages.

* cited by examiner

*Primary Examiner* — Taelor Kim

(74) *Attorney, Agent, or Firm* — Workman Nydegger

(57) ABSTRACT

Using a block-based region file to extend a composite image (CIM). A device determines to replace a first file with a second file within a filesystem volume of the CIM. The device identifies a first file definition within CIM metadata, which defines the first data of the first file as including a first data block of a first CIM region file comprising equally-sized data blocks. The device extends the CIM to include the second file. The extension includes adding a second region file comprising equally-sized data blocks to the CIM, including writing a portion of data from the second file into a second data block of the second region file. The extension also includes writing a second file definition to the CIM metadata, which defines the second data of the second file as including the first data block and the second data block.

19 Claims, 6 Drawing Sheets

200

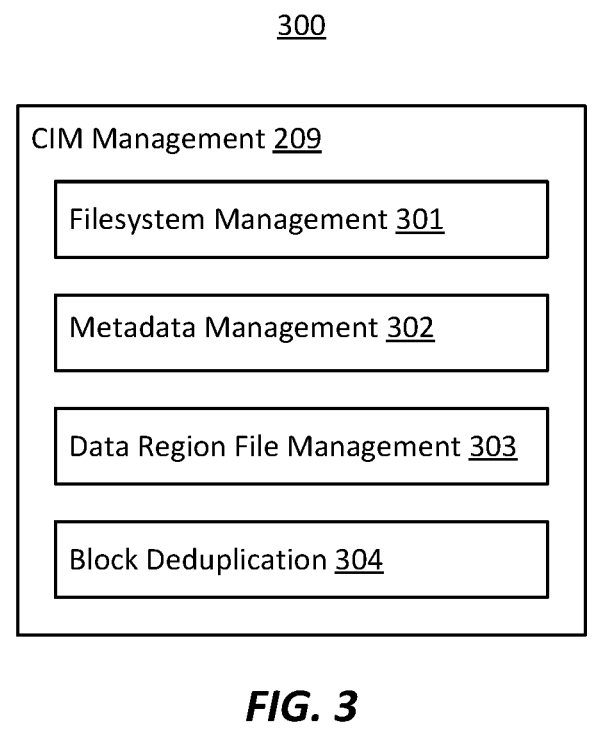

300

CIM Management 209

Filesystem Management 301

Metadata Management 302

Data Region File Management 303

Block Deduplication 304

*FIG. 3*

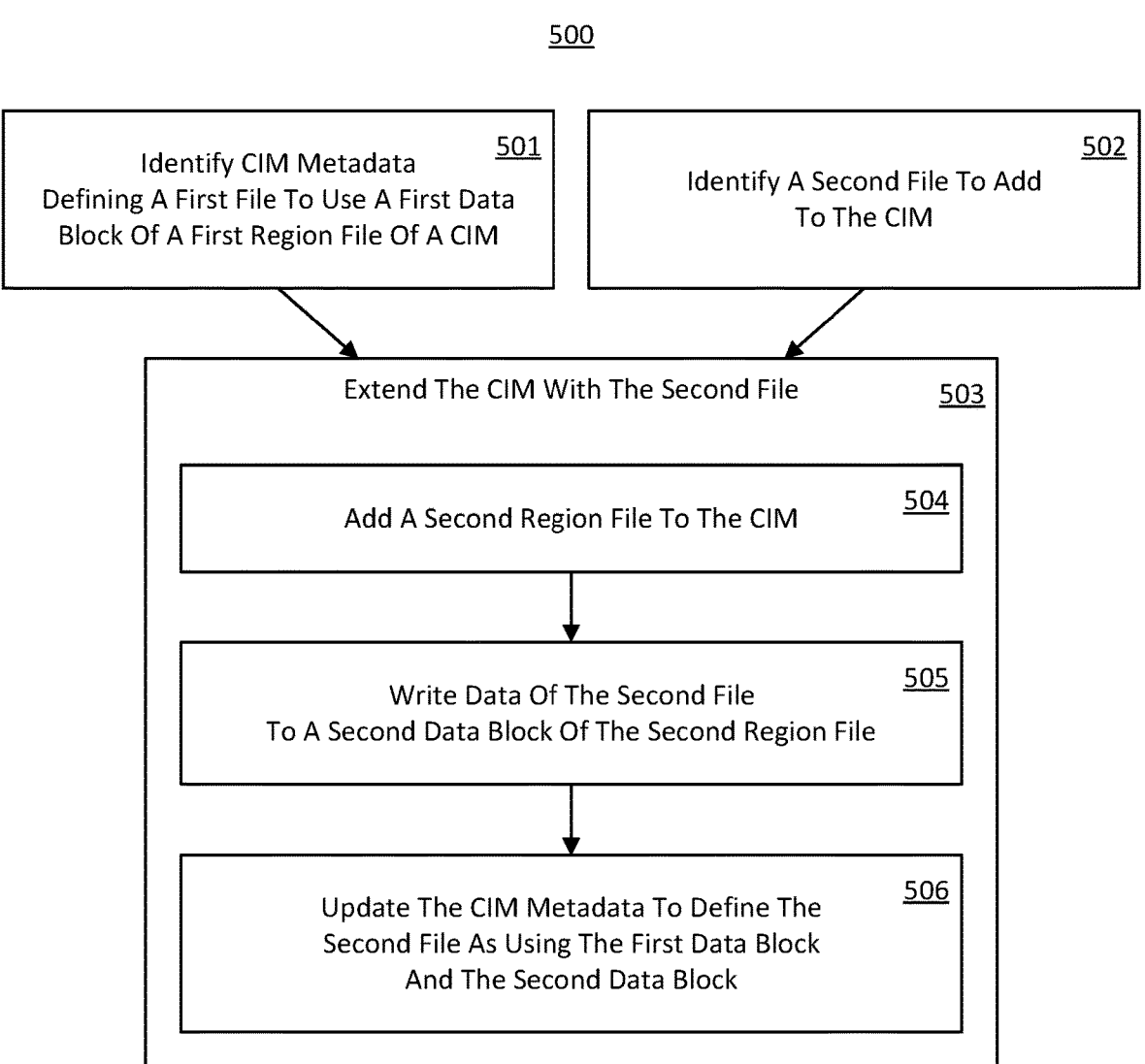

500

Identify CIM Metadata        501
Defining A First File To Use A First Data
Block Of A First Region File Of A CIM Identify A Second File To Add        502
To The CIM Extend The CIM With The Second File        503

Add A Second Region File To The CIM        504

Write Data Of The Second File        505
To A Second Data Block Of The Second Region File Update The CIM Metadata To Define The        506
Second File As Using The First Data Block
And The Second Data Block

FIG. 5

STORING FILES IN BLOCKS WITHIN COMPOSITE IMAGES

BACKGROUND

It is common for modern computer systems to create different privilege contexts using containerization technologies. In general, containerization refers to the ability of a computer system to provide guest contexts (or partitions) in which one or more processes or even an entire operating system (OS) run in relative isolation. For instance, OS-level virtualization technologies refer to containerization in which guest contexts are isolated user-space instances created by a host OS kernel and in which user-space processes can run on top of that kernel in isolation from other guest contexts created by the same kernel. Examples of OS-level virtualization technologies include containers (DOCKER), Zones (SOLARIS), and jails (FREEBSD). Hypervisor-based virtualization technologies refer to containerization in which guest contexts are virtual hardware machines created by a host OS that includes a hypervisor and in which an entire additional OS can run in isolation from other virtual machines. Examples of hypervisor-based virtualization technologies include HYPER-V (MICROSOFT), XEN (LINUX), VMWARE, VIRTUALBOX (ORACLE), and BHYVE (FREEBSD).

Regardless of the containerization technology used, a guest context generally needs access to a filesystem volume, such as a filesystem volume comprising files for an OS, files for applications, and the like. As such, various disk and/or filesystem "image" formats are employed by various containerization technologies, each with its own benefits and drawbacks.

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products, including: determining to replace a first file of a filesystem volume that is contained within a composite image (CIM) with a second file; identifying a first file definition within a metadata portion of the CIM, the first file definition defining first data of the first file as including a first data block of a first region file of the CIM that includes a first plurality of equally-sized data blocks; and extending the CIM to include the second file, including: adding a second region file to the CIM that includes a second plurality of equally-sized data blocks, including writing a portion of data from the second file into a second data block of the second region file; and writing a second file definition to the metadata portion of the CIM, the second file definition defining second data of the second file as including, the first data block within the first region file; and the second data block of the second region file.

In some aspects, the techniques described herein relate to methods, systems, and computer program products, including: determining to replace a first file of a filesystem volume that is contained within a CIM with a second file; identifying a first file definition within a metadata portion of the CIM, the first file definition defining first data of the first file as including a first data block of a first region file of the CIM that includes a first plurality of equally-sized data blocks; and extending the CIM to include the second file, including: adding a second region file to the CIM that includes a second plurality of equally-sized data blocks, including writing a portion of data from the second file into a second data block of the second region file; and replacing the first file definition with a second file definition, the second file definition defining second data of the second file as including, the first data block within the first region file; and the second data block of the second region file.

In some aspects, the techniques described herein relate to methods, systems, and computer program products, including: determining to replace a first file of a filesystem volume that is contained within a CIM with a second file; identifying a first file definition within a metadata portion of the CIM, the first file definition defining first data of the first file as including a first data block of a first region file of the CIM that includes a first plurality of equally-sized data blocks; and extending the CIM to include the second file, including: adding a second region file to the CIM that includes a second plurality of equally-sized data blocks, including writing a portion of data from the second file into a second data block of the second region file; writing a second file definition to the metadata portion of the CIM, the second file definition defining second data of the second file as including the first data block within the first region file and the second data block of the second region file; and incrementing a reference count for the second data block.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which:

FIG. 3 illustrates an example of a CIM extension component.

FIG. 5 illustrates a flow chart of an example of a method for using block-based region files to extend a CIM.

DETAILED DESCRIPTION

Some filesystem image formats used with containerization technologies are file-based. One family of file-based image formats, referred to herein as a composite image (CIM) format, comprises a first set of one or more files for storing metadata defining the files within a filesystem volume, as well as a second set of one or more files for storing those files' data. In this description and in the claims, any filesystem image that uses a CIM format is referred to as a CIM.

As mentioned, a CIM defines a filesystem volume using separated metadata and data. Using current CIM formats, a CIM comprises metadata comprising a set of metadata files (e.g., a metadata region file, an object identifier file, a filesystem description file) to define a filesystem volume and any files contained therein. For each file, the CIM's metadata defines relevant information such as a file name, a file identifier, a location of the file within a directory hierarchy, a set of file attributes (e.g., size, permissions, creation time, access time), and the like. Additionally, using current CIM formats, the CIM comprises a set of data region files to store the actual data of the files defined by the CIM's metadata. Each data region file comprises blob data that embodies the data of a plurality of the files defined by the CIM's metadata (e.g., the data of a plurality of files concatenated together, one after another). For each file that has data associated therewith (e.g., non-empty files), a CIM's metadata defines the location of that file's data within a single one of the CIM's data region files (e.g., using a byte offset and a byte length within that region file). A CIM filesystem uses the CIM's metadata to mount the CIM as a filesystem.

CIM formats facilitate efficiently deploying a filesystem volume embodied by a CIM to a given guest context. For example, when deploying a CIM to a guest context, each data region file can be extracted to destination storage as a single file rather than the multiple individual files contained therein. This is beneficial because writing a single larger file is often less time-consuming and computing resource intensive than writing a plurality of smaller files that, together, embody the same data as the single larger file. Thus, CIMs are faster to construct, extract, and delete than the equivalent raw directories they contain.

Figure 1B:
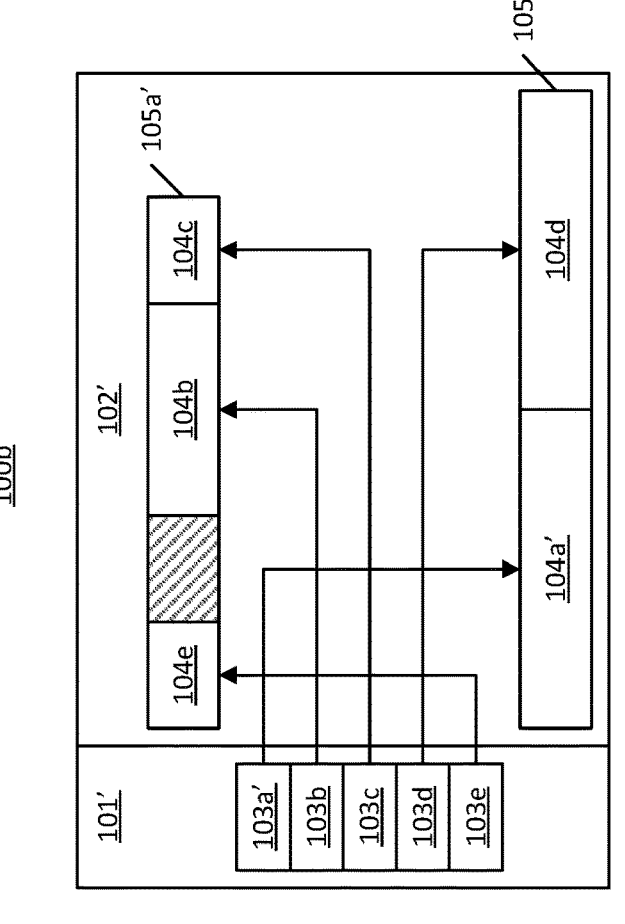
FIGS. 1A and 1B illustrate examples of extending a composite image (CIM) that uses conventional data region files comprising variable-sized data portions.
Figure 1A:
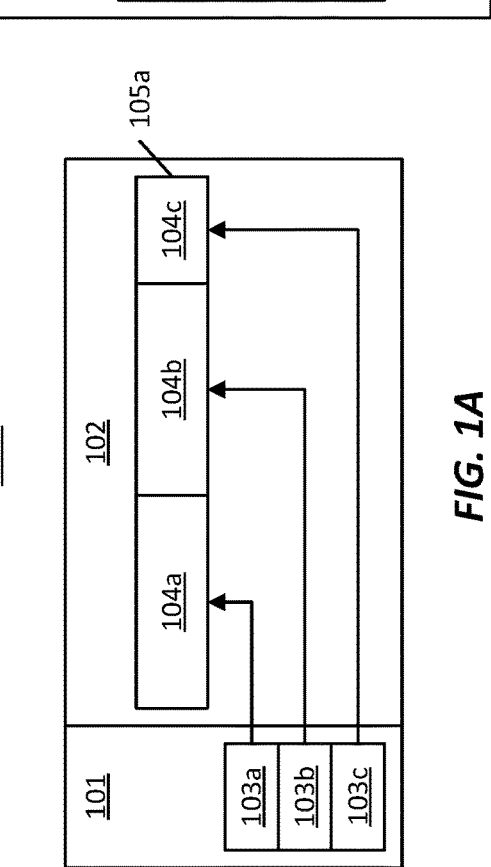

In some examples, modifying the filesystem volume within a CIM (e.g., to add, delete, or modify files or directories within the filesystem volume) involves extending (e.g., reconstructing) the CIM to include one or more new data region files. FIGS. 1A and 1B illustrate an example of extending a CIM that uses current CIM formats. Referring initially to FIG. 1A, example 100a shows a metadata portion 101 and a data portion 102 of a CIM, with metadata portion 101 including file definition 103a to file definition 103c and data portion 102 including a data region file 105a. In example 100a, file definition 103a defines a first file within a filesystem volume, including referencing the first file's data within data region file 105a (e.g., data 104a); file definition 103b defines a second file within the filesystem volume, including referencing the second file's data within data region file 105a (e.g., data 104b); and file definition 103c defines a third file within the filesystem volume, including referencing the third file's data within data region file 105a (e.g., data 104c). As shown in FIG. 1A, data region file 105a comprises variable-sized data portions, with each file defined by file definitions 103a-103c being fully and contiguously contained within data region file 105a. In some examples, file definition 103a to file definition 103c each refers to their corresponding file data within data region file 105a by an offset (e.g., a number of bytes from the beginning of data region file 105a at which the corresponding file data begins) and a length (e.g., a number of bytes the corresponding file data occupies within data region file 105a).

Referring now to FIG. 1B, example 100b shows the CIM of FIG. 1A after it has been extended by replacing the first file within the filesystem volume with a larger version of the first file and adding two new files to the filesystem volume. As shown, extending the CIM includes adding a data region file 105b to data portion 102 (now data portion 102') and updating the file definitions within metadata portion 101 (now data portion 101'). As shown, file definition 103a has been updated (e.g., file definition 103a') to reference its files' data within data region file 105b (e.g., data 104a') rather than data region file 105a (now, data region file 105a'). Additionally, file definition 103d defines a fourth file within the filesystem volume, including referencing the fourth file's data within data region file 105b (e.g., data 104d); and file definition 103e defines a fifth file within the filesystem volume, including referencing the fifth file's data within data region file 105a' (e.g., data 104e). Notably, while data 104e was stored within a portion of data region file 105a' that was previously occupied by data 104a, there remains a portion of data region file 105a' that is wasted (e.g., the shaded portion of data region file 105a').

The embodiments described herein address the foregoing inefficiencies of current CIM formats (e.g., waste of storage space when extending an existing CIM) while preserving their benefits (e.g., being faster to construct, extract, and delete than the equivalent raw directories they contain). These embodiments are based on introducing data region files that are comprised of fixed-size data blocks (e.g., as opposed to conventional variable file-sized data portions that contiguously store the entire data of a file). These embodiments are further based on referring to a given file's data based on a list of blocks within one or more data region files (e.g., as opposed to an offset and length within a single data region file). As will be demonstrated, using data region files that use fixed-size data blocks introduces opportunities to fully reuse space on existing data region files when extending a CIM. As will also be demonstrated, data region files that use fixed-size data blocks introduce novel opportunities to use block-level deduplication within a CIM.

Figure 2:
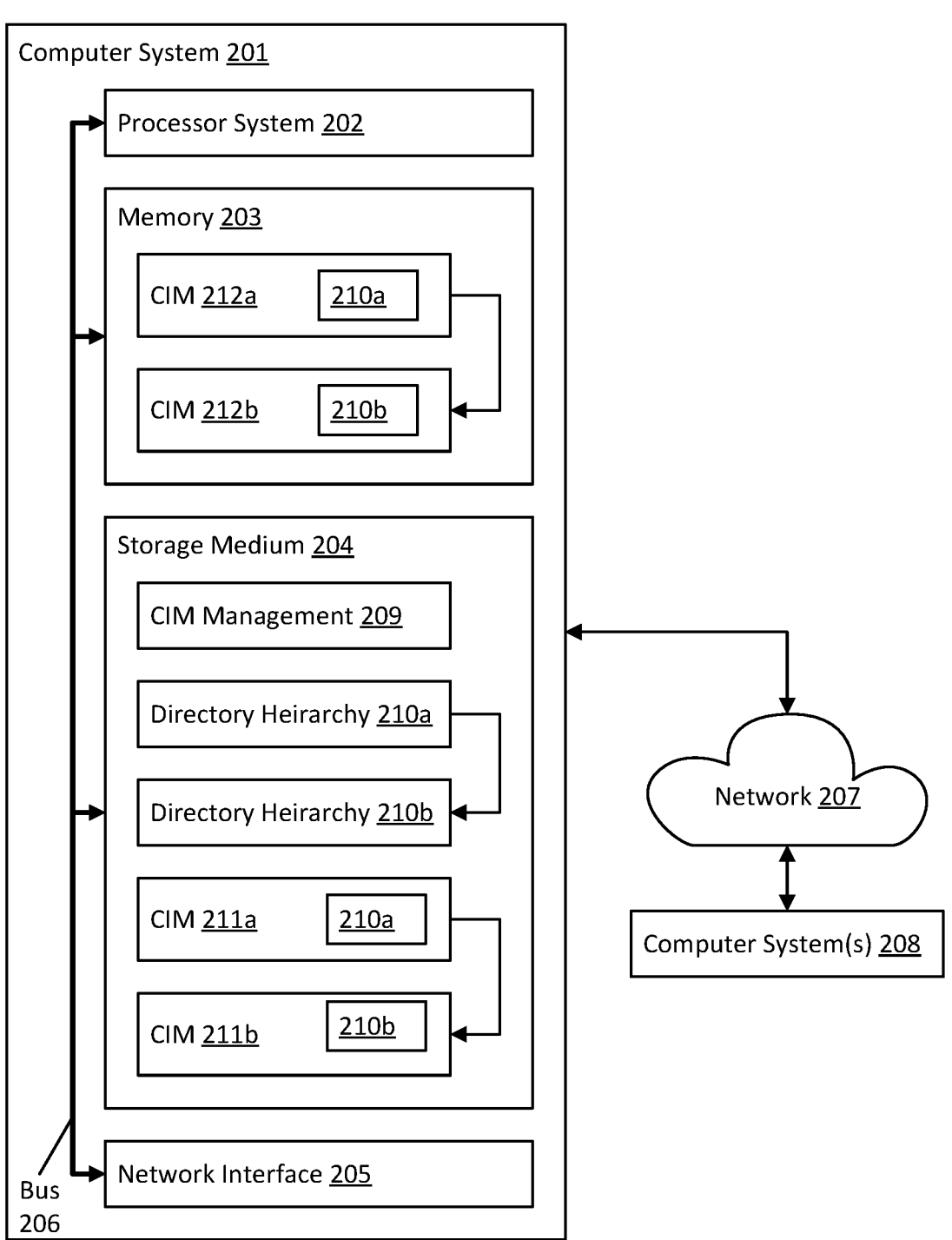
FIG. 2 illustrates an example of a computer architecture that facilitates using block-based region files to extend a CIM.

FIG. 2 illustrates an example of computer architecture 200 that uses block-based region files to extend a CIM. As shown, computer architecture 200 includes a computer system 201 comprising a processor system 202 (e.g., a single processor or a plurality of processors), a memory 203 (e.g., system or main memory), and a storage medium 204 (e.g., a single computer-readable storage medium, or a plurality of computer-readable storage media), all interconnected by a bus 206. As shown, computer system 201 may also include a network interface 205 (e.g., one or more network interface cards) for interconnecting (via a network 207) to computer system 208 (e.g., a single computer system or a plurality of computer systems). Notably, the embodiments herein can be distributed across a plurality of computer systems. Thus, any of the components or data described herein (e.g., within memory 203 and/or storage medium 204) could reside, at least in part, at computer system 208. Additionally, any of the functionality described herein could be performed, at least in part, at computer system 208.

In FIG. 2, storage medium 204 is illustrated as storing computer-executable instructions implementing a CIM management component 209 that manages the construction (e.g., creation and extension) of CIMs. In FIG. 2, storage medium 204 is illustrated as storing a directory hierarchy 210a. In embodiments, CIM management component 209 creates a new CIM (e.g., CIM 211a in storage medium 204, CIM 212a in memory 203) whose embodied filesystem volume mirrors directory hierarchy 210a. For example, CIM management component 209 creates a CIM comprising metadata defining the files within directory hierarchy 210a as well as one or more data region files that comprise the data of the files within directory hierarchy 210a. In embodiments, CIM management component 209 constructs CIM 212a within memory 203. In some embodiments, CIM management component 209 persists CIM 212a to storage medium 204 as CIM 211a.

In FIG. 2, storage medium 204 is illustrated as also storing a directory hierarchy 210b. As indicated by an arrow extending from directory hierarchy 210a to directory hierarchy 210b, directory hierarchy 210b is derived from directory hierarchy 210a (e.g., by the addition of one or more objects (e.g., files or directories) to directory hierarchy 210a, by the removal of one or more objects from directory hierarchy 210a, by the modification of one or more objects within directory hierarchy 210a). In embodiments, CIM management component 209 extends an existing CIM (e.g., CIM 211a in storage medium 204, CIM 212a in memory 203) whose filesystem volume embodies directory hierarchy 210a, resulting in a CIM (e.g., CIM 211b in storage medium 204, CIM 212b in memory 203) whose embodied filesystem volume mirrors directory hierarchy 210b. In embodiments, CIM management component 209 extends CIM 212a within memory 203, resulting in CIM 212b within memory 203. In some embodiments, CIM management component 209 persists CIM 212b to storage medium 204 as CIM 211b.

In some embodiments, directory hierarchy 210a and directory hierarchy 210b coexist (e.g., modifications to directory hierarchy 210a are applied to a copy of directory hierarchy 210a). In other embodiments, directory hierarchy 210b replaces directory hierarchy 210a (e.g., modifications to directory hierarchy 210a are applied to directory hierarchy 210a directly). In some embodiments, CIM 211a and CIM 211b coexist (e.g., CIM management component 209 persists CIM 212b to CIM 211b in storage medium 204 while retaining CIM 211a). In other embodiments, CIM 211b replaces CIM 211a (e.g., CIM management component 209 persists CIM 212b to CIM 211b in storage medium 204 while removing or overwriting CIM 211a).

FIG. 3 illustrates an example 300 of the CIM management component 209 of FIG. 2. Each component of CIM management component 209 depicted in FIG. 3 represents various functionalities that CIM management component 209 may implement under the embodiments described herein. These components—including their identity and arrangement—are presented merely as an aid in describing example embodiments of CIM management component 209.

In example 300, CIM management component 209 includes a filesystem management component 301. In embodiments, the filesystem management component 301 determines a structure of a filesystem volume that is to be contained within a CIM. In the context of creating a CIM, filesystem management component 301 determines a structure of a filesystem volume that mirrors an input directory hierarchy (e.g., directory hierarchy 210a). In the context of extending a CIM, filesystem management component 301 determines one or more differences (e.g., added objects, removed objects, changed objects) between a directory hierarchy that is already represented by a CIM (e.g., directory hierarchy 210a represented by CIM 211a) and a target directory hierarchy (e.g., directory hierarchy 210b).

In example 300, CIM management component 209 also includes a metadata management component 302. In embodiments, the metadata management component 302 creates and/or modifies the CIM metadata that defines a filesystem volume embodied by the CIM. In the context of creating a CIM, metadata management component 302 creates new metadata representing the objects (e.g., files and directories) of an input directory hierarchy. In the context of extending a CIM, metadata management component 302 determines changes (e.g., modifications, additions, removals) to existing CIM metadata to capture the differences between a directory hierarchy that is already represented by a CIM and a target directory hierarchy.

In example 300, CIM management component 209 also includes a data region file management component 303. In embodiments, the data region file management component 303 manages one or more data region files contained within a CIM. Conventionally, CIMs comprised data regions, such as data region file 105a and data region file 105b described in connection with FIGS. 1A and 1B, that relied on using variable file-sized data portions to contiguously store the entirety of each file. While data region file management component 303 may also support the creation and use of variable file-sized data portions, data region file management component 303 introduces data region files that use fixed-size data blocks. As mentioned, using data region files that use variable file-sized data portions introduces opportunities to more fully reuse space on existing data region files when CIM management component 209 extends an existing CIM.

Figures 4A, 4B:
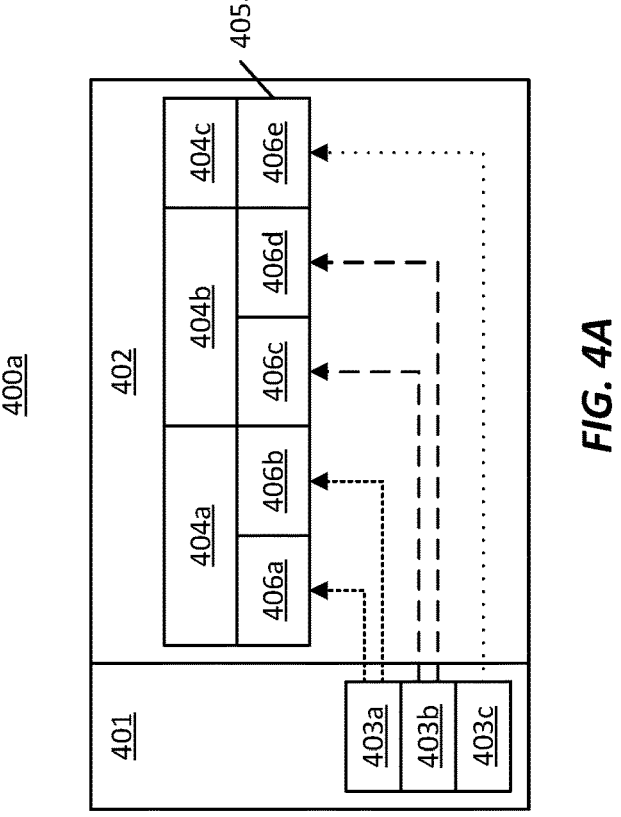
FIGS. 4A and 4B illustrate examples of extending a CIM that uses data region files comprising fixed-sized data portions.

FIGS. 4A and 4B illustrate an example of extending a CIM that uses data region files comprising fixed-sized data portions. Referring initially to FIG. 4A, and much like example 100a, example 400a shows a metadata portion 401 and a data portion 402 of a CIM, with metadata portion 401 including file definition 403a to file definition 403c and data portion 402 including a data region file 405a. Data region file 105a of example 100a used variable file-sized blocks; in contrast, example 400a shows that data region file 405a uses fixed-sized blocks, including data block 406a to data block 406e. In example 400a, file definition 403a defines a first file within a filesystem volume, including referencing the first file's data within data region file 405a by reference to data blocks 406a and 406b (collectively, data 404a); file definition 403b defines a second file within the filesystem volume, including referencing the second file's data within data region file 405a by reference to data blocks 406c and 406d (collectively, data 404b), and file definition 403c defines a third file within the filesystem volume, including referencing the third file's data within data region file 405a by reference to data block 406e (data 404c).

Referring now to FIG. 4B, example 400b shows the CIM of FIG. 4A after it has been extended by replacing the first file within the filesystem volume with a larger version of the first file and adding two new files to the filesystem volume, much like in example 100b. As shown in example 400b, the CIM management component 209 has extended the CIM by adding a data region file 405b (e.g., data block 407a to data block 407e) to data portion 402 (now, data portion 402'), and updating the file definitions within metadata portion 401 (now metadata portion 401'). As shown, file definition 403a has been updated (e.g., file definition 403a') to reference data block 406a within data region file 405a', data block 407a within data region file 405b, and 407b within data region file 405b (collectively, data 404a'). In example 400b, data block 406a within data region file 405a' is identical to data block 406a within data region file 405a (e.g., because the data within that portion of the file did not change). However, in other examples, data block 406a within data region file 405a' is different from data block 406a within data region file 405a (e.g., because the data within that portion of the file has changed). Additionally, file definition 403d defines a fourth file within the filesystem volume, including referencing the fourth file's data within data region file 405*b* by reference to data block 407*c*, data block 407*d*, and data block 407*e* (collectively, data 404*d*). Finally, file definition 403*e* defines a fifth file within the filesystem volume, including referencing the fifth file's data within data region file 405*a'* by reference to data block 406*b'* (data 404*e*).

While the changes to the filesystem volume were much like in example 100*b* (e.g., replacing the first file within the filesystem volume with a larger version of the first file and adding two new files to the filesystem volume), in example 400*b* CIM management component 209 has utilized fixed-size data blocks utilize space on data region file 405*a'* that was previously occupied by data 404*a* more efficiently than was the case for data region file 105*a'* in example 100*b*. As a result, the CIM illustrated in example 400*b* consumes less space than the CIM illustrated in example 100*b*, even though it was extended with the same files.

In some examples, CIM management component 209 also includes a block deduplication component 304. The inclusion of block deduplication component 304 is enabled by the support of data region files that use fixed-size data blocks by the data region file management component 303. In embodiments, block deduplication component 304 generates a digest for each fixed-size data block, with each digest representing the data stored within its corresponding data block. In embodiments, block deduplication component 304 generates each digest using a hash function (e.g., a cryptographic hash function, such as one of the Secure Hash Algorithms published by the National Institute of Standards and Technology) that has strong collision resistance (e.g., which produces a unique digest for each unique input with a cryptographically significant degree of reliability). Using these digests, block deduplication component 304 reduces the size of data region files within CIMs by ensuring that only one copy of each unique data block exists within a CIM.

In some embodiments, block deduplication component 304 uses reference counting to determine when a data block is no longer being used. For example, block deduplication component 304 increments a reference count for a given data block each time that block is referred to by a file definition and decrements the reference count when a reference to the data block is removed from a file definition. If the reference count reaches zero, then block deduplication component 304 frees the data block.

Figure 4C:
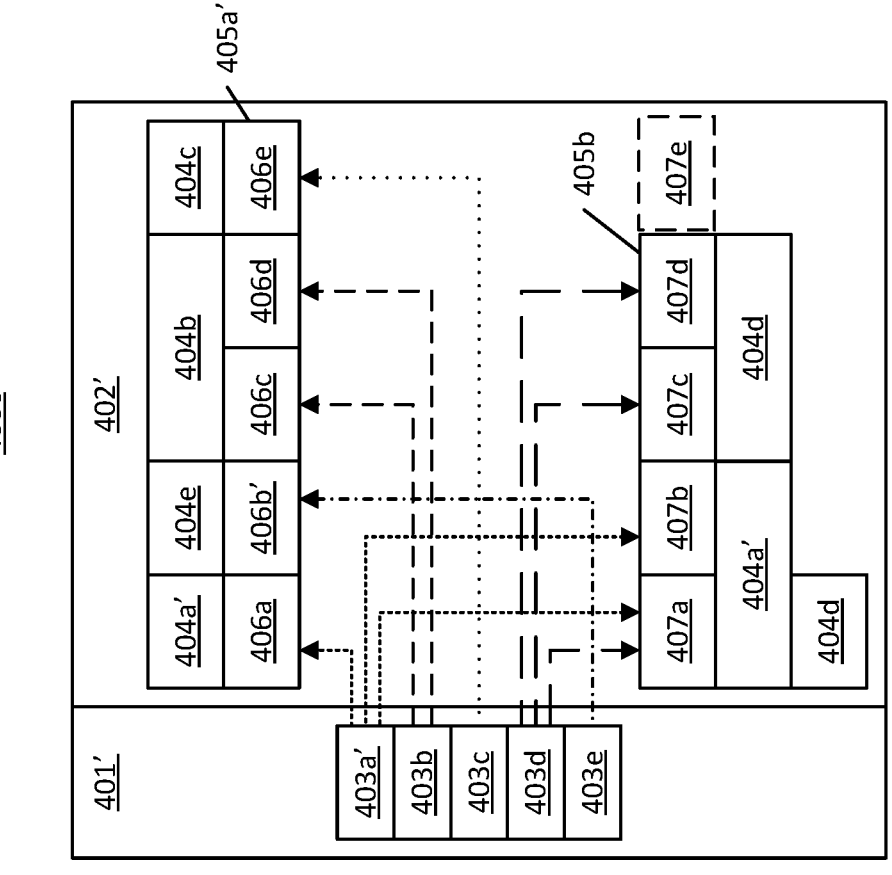
FIG. 4C illustrates an example of block-level deduplication within a CIM.

FIG. 4C illustrates an example 400*c* of block-level deduplication within a CIM. In example 400*c*, a file definition 403*d* references data block 407*a* rather than data block 407*e*, as was the case in example 400*b*. Thus, in example 400*c*, block deduplication component 304 has determined that the data stored on data block 407*a* and the portion of data that would have been stored on data block 407*e* are identical (e.g., based on those data blocks having the same digest). As a result, data region file management component 303 has omitted data block 407*e* from data region file 405*b*, and metadata management component 302 has referenced data block 407*a* in place of data block 407*e*. As a result, the CIM that is illustrated in example 400*c* consumes less space than the CIM that is illustrated in example 400*b*, even though they were extended with the same files. Notably, although not illustrated in example 400*c*, a single block can be used multiple times by different file definitions.

Embodiments are now described in connection with FIG. 5, which illustrates a flow chart of an example method 500 for using block-based region files to extend a CIM. In embodiments, instructions for implementing method 500 are encoded as computer-executable instructions (e.g., CIM management component 209) stored on a computer storage media (e.g., storage medium 204) that are executable by a processor (e.g., processor system 202) to cause a computer system (e.g., computer system 201) to perform method 500.

The following discussion now refers to a method and method acts. Although the method acts are discussed in specific orders or are illustrated in a flow chart as occurring in a particular order, no order is required unless expressly stated or required because an act is dependent on another act being completed prior to the act being performed.

Referring to FIG. 5, in embodiments, method 500 comprises act 501 of identifying CIM metadata defining a first file to use a first data block of a first region file of a CIM. In some embodiments, act 501 comprises identifying a first file definition within a metadata portion of the CIM, the first file definition defining the first data of the first file as including a first data block of a first region file of the CIM that comprises a first plurality of equally-sized data blocks. For example, the metadata management component 302 identifies file definition 403*a* from the metadata portion 401 of the CIM of example 400*a*, which, in this example, comprises CIM 211*a* embodying a filesystem volume corresponding to directory hierarchy 210*a*. As described, file definition 403*a* references data block 406*a* as being part of the data 404*a* of the file defined by file definition 403*a*.

Method 500 also comprises act 502 of identifying a second file to add to the CIM. In some embodiments, act 502 comprises determining to replace a first file of a filesystem volume that is contained within a CIM with a second file. For example, the filesystem management component 301 determines, based on directory hierarchy 210*a*, that a file is to be added to the filesystem volume embodied by CIM 211*a*. For example, the filesystem management component 301 determines that a file (e.g., the second file) within directory hierarchy 210*b* replaces a file (e.g., the first file) within directory hierarchy 210*a* (e.g., the first file has been modified, resulting in the second file).

In FIG. 5, no order is specified between act 501 and act 502. Thus, in various embodiments, these acts are performed serially (in either order) or in parallel. Regardless of their ordering, after act 501 and act 502, method 500 also comprises act 503 of extending the CIM with the second file. In some embodiments, act 503 comprises extending the CIM to include the second file.

As shown, in some embodiments, act 503 comprises act 504 of adding a second region file to the CIM. In some embodiments, act 504 comprises adding a second region file to the CIM that comprises a second plurality of equally-sized data blocks. For example, in example 400*b*, the data region file management component 303 adds data region file 405*b*, which comprises a plurality of fixed-sized blocks (e.g., data block 407*a* to data block 407*e*).

As shown, in some embodiments, act 503 comprises act 505 of writing data of the second file to a second data block of the second region file. In some embodiments, act 505 comprises writing a portion of data from the second file into a second data block of the second region file. For example, data region file management component 303 writes data block 407*a* and data region file 407*b* with different portions of data of the second file.

As shown, in some embodiments, act 503 comprises act 506 of updating the CIM metadata to define the second file as using the first data block and the second data block. In some embodiments, act 506 comprises writing a second file definition to the metadata portion of the CIM, the second file definition defining the second data of the second file as including 1) the first data block within the first region file and 2) the second data block of the second region file. For example, the metadata management component 302 writes file definition 403a', which defines a file that refers to data block 406a within data region file 405a', as well as data block 407a within data region file 405b.

As mentioned in connection with FIG. 2, in some embodiments, CIM 211a and CIM 211b coexist (e.g., CIM management component 209 persists CIM 212b to CIM 211b in storage medium 204 while retaining CIM 211a). Thus, in some embodiments of method 500, adding the second region file to the CIM comprises adding the second region file to a copy of the CIM, and writing the second file definition to the metadata portion of the CIM comprises writing the second file definition to a metadata portion of the copy of the CIM. In other embodiments, CIM 211b replaces CIM 211a (e.g., CIM management component 209 persists CIM 212b to CIM 211b in storage medium 204 while removing or overwriting CIM 211a). Thus, in some embodiments of method 500, the second file definition replaces the first file definition within the metadata portion of the CIM.

In example 400b, data block 406a within data region file 405a' was identical to data block 406a within data region file 405a (e.g., because the data within that portion of the file did not change). However, in other examples, data block 406a within data region file 405a' could be different from data block 406a within data region file 405a (e.g., because the data within that portion of the file has changed). In these latter examples, extending the CIM to include the second file can include writing a portion of data from the second file into the first data block of the first region file.

In example 400b, data block 406b within data region file 405a' was freed and was then used to store data 404e (e.g., data block 406b'). Thus, in some embodiments of method 500, the first file definition also defines the first data of the first file as including a third data block (e.g., data block 406b) of the first region file of the CIM. In these embodiments, extending the CIM to include the second file includes marking the third data block as free (e.g., so that data block 406b can be overwritten, resulting in data block 406b').

As mentioned, in some embodiments, data region file management component 303 may support the creation and use of variable file-sized data portions for data region files, in addition to the creation and use of fixed-sized blocks for data region files. This means that a given CIM could include a mix of one or more data region files using variable file-sized data portions and one or more data region files using fixed-sized blocks. Thus, in some embodiments of method 500, the CIM also comprises a third region file comprising variable-sized data portions, each data portion storing data of an entire file.

Some embodiments employ the block deduplication component 304 to reduce the size of a CIM when the CIM would contain identical data blocks. For example, some embodiments of method 500 generate a digest for each data block and use these digests to avoid including duplicate data blocks within a CIM. In one example, and referring to example 400c, method 500 includes generating a first digest from a data block (e.g., data block 407a). Then, when extending the CIM to include a third file (e.g., a file corresponding to file definition 403d), method 500 includes generating a second digest from a portion of data of the third file (e.g., the portion of the file that was data block 407e in example 400b), and writing a third file definition (file definition 403d) to the metadata portion of the CIM. Here, the third file definition defines third data (data 404d) of the third file as including the second data block of the second region file based on the first digest equaling the second digest.

As mentioned, block deduplication component 304 may keep a reference count for each data block and use that reference count to determine when a data block can be freed (e.g., when the reference count reaches zero). Thus, in embodiments, method 500 further comprises incrementing a reference count associated with the second data block based on writing the second file definition (e.g., file definition 403a') and incrementing the reference count associated with the second data block based on writing the third file definition (e.g., file definition 403d). Additionally, in embodiments, method 500 further comprises decrementing the reference count associated with the second data block based on a removal of the second file from the CIM, decrementing the reference count associated with the second data block based on a removal of the third file from the CIM, and marking the second data block as free based on the reference count reaching zero.

Embodiments of the disclosure comprise or utilize a special-purpose or general-purpose computer system (e.g., computer system 201) that includes computer hardware, such as, for example, a processor system (e.g., processor system 202) and system memory (e.g., memory 203), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage medium 204). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 205) and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In embodiments, computer-executable instructions comprise binaries, intermediate format instructions (e.g., assembly language), or source code. In embodiments, a processor system comprises one or more central processing units (CPUs), one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAS, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (Saas), Platform as a Service (PaaS), Infrastructure as a Service (IaaS), etc. The cloud computing model may also be deployed using different deployment models such as private cloud, community cloud, public cloud, hybrid cloud, etc.

Some embodiments, such as a cloud computing environment, comprise a system with one or more hosts capable of running one or more virtual machines (VMs). During operation, VMs emulate an operational computing system, supporting an operating system (OS) and perhaps one or more other applications. In some embodiments, each host includes a hypervisor that emulates virtual resources for the VMs using physical resources that are abstracted from the view of the VMs. The hypervisor also provides proper isolation between the VMs. Thus, from the perspective of any given VM, the hypervisor provides the illusion that the VM is interfacing with a physical resource, even though the VM only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented in a computer system that includes a processor system, comprising:

determining to replace a first file of a filesystem volume that is contained within a composite image (CIM) with a second file, the filesystem volume defining a first directory hierarchy;

identifying a first file definition within a metadata portion of the CIM, the first file definition defining first data of the first file as including a first data block of a first region file of the CIM that comprises a first plurality of equally-sized data blocks; and replacing the first file with the second file within the CIM, including:

adding a second region file to the CIM that comprises a second plurality of equally-sized data blocks, including writing a portion of data from the second file into a second data block of the second region file;

writing a second file definition to the metadata portion of the CIM, the second file definition:

defining second data of the second file as including the first data block within the first region file of the CIM, and defining the second data of the second file as also including the second data block of the second region file of the CIM; and incrementing a reference count associated with the second data block;

wherein the second file definition replaces the first file definition within the metadata portion of the CIM, and the CIM after the replacement embodies a second directory hierarchy that is the same as the first directory hierarchy.

2. The method of claim 1, wherein:

the portion of data from the second file is a first portion of data from the second file; and extending the CIM to include the second file also includes writing a second portion of data from the second file into the first data block of the first region file.

3. The method of claim 1, wherein:

the first file definition also defines the first data of the first file as including a third data block of the first region file of the CIM; and extending the CIM to include the second file includes marking the third data block as free.

4. The method of claim 1, wherein the method further comprises:

generating a first digest from the second data block; and extending the CIM to include a third file, including:

generating a second digest from a portion of data of the third file; and writing a third file definition to the metadata portion of the CIM, the third file definition defining third data of the third file as including the second data block of the second region file based on the first digest equaling the second digest.

5. The method of claim 4, wherein the method further comprises:

incrementing the reference count associated with the second data block based on writing the third file definition.

6. The method of claim 5, wherein the method further comprises:

decrementing the reference count associated with the second data block based on a removal of the second file from the CIM;

decrementing the reference count associated with the second data block based on a removal of the third file from the CIM; and marking the second data block as free based on the reference count reaching zero.

7. The method of claim 1, wherein the first data block and the second data block are equally sized.

8. The method of claim 1, wherein the CIM comprises a third region file comprising variable-sized data portion, each data portion storing data of an entire file.

9. The method of claim 1, wherein:

adding the second region file to the CIM comprises adding the second region file to a copy of the CIM; and writing the second file definition to the metadata portion of the CIM comprises writing the second file definition to a metadata portion of the copy of the CIM.

10. A computer system, comprising:

a processor system; and a computer storage media that stores computer-executable instructions that are executable by the processor system to at least:

determine to replace a first file of a filesystem volume that is contained within a composite image (CIM) with a second file, the filesystem volume defining a first directory hierarchy;

identify a first file definition within a metadata portion of the CIM, the first file definition defining first data of the first file as including a first data block of a first region file of the CIM that comprises a first plurality of equally-sized data blocks; and replacing the first file with the second file within the CIM, including:

adding a second region file to the CIM that comprises a second plurality of equally-sized data blocks, including writing a portion of data from the second file into a second data block of the second region file;

replacing the first file definition with a second file definition within the metadata portion of the CIM, the second file definition:

defining second data of the second file as including the first data block within the first region file of the CIM, and defining the second data of the second file as also including the second data block of the second region file of the CIM; and incrementing a reference count associated with the second data block;

wherein the second file definition replaces the first file definition within the metadata portion of the CIM, and the CIM after the replacement embodies a second directory hierarchy that is the same as the first directory hierarchy.

11. The computer system of claim 10, wherein:

the portion of data from the second file is a first portion of data from the second file; and extending the CIM to include the second file also includes writing a second portion of data from the second file into the first data block of the first region file.

12. The computer system of claim 10, wherein:

the first file definition also defines the first data of the first file as including a third data block of the first region file of the CIM; and extending the CIM to include the second file includes freeing the third data block.

13. The computer system of claim 10, wherein the computer-executable instructions that are also executable by the processor system to:

generate a first digest from the second data block; and extend the CIM to include a third file, including:

generating a second digest from a portion of data of the third file; and writing a third file definition to the metadata portion of the CIM, the third file definition defining third data of the third file as including the second data block of the second region file based on the first digest equaling the second digest.

14. The computer system of claim 13, wherein the computer-executable instructions that are also executable by the processor system to:

increment the reference count associated with the second data block based on writing the third file definition.

15. The computer system of claim 14, wherein the computer-executable instructions that are also executable by the processor system to:

decrement the reference count associated with the second data block based on a removal of the second file from the CIM;

decrement the reference count associated with the second data block based on a removal of the third file from the CIM; and mark the second data block as free based on the reference count reaching zero.

16. The computer system of claim 10, wherein the first data block and the second data block are equally sized.

17. The computer system of claim 10, wherein the CIM comprises a third region file comprising variable-sized data portions, each data portion storing data of an entire file.

18. The computer system of claim 10, wherein adding the second region file to the CIM comprises adding the second region file to a copy of the CIM.

19. A computer storage medium that stores computer-executable instructions that are executable by a processor system to at least:

determine to replace a first file of a filesystem volume that is contained within a composite image (CIM) with a second file, the filesystem volume defining a first directory hierarchy;

identify a first file definition within a metadata portion of the CIM, the first file definition defining first data of the first file as including a first data block of a first region file of the CIM that comprises a first plurality of equally-sized data blocks; and replacing the first file with the second file within the CIM, including:

adding a second region file to the CIM that comprises a second plurality of equally-sized data blocks, including writing a portion of data from the second file into a second data block of the second region file;

writing a second file definition to the metadata portion of the CIM, the second file definition:

defining second data of the second file as including the first data block within the first region file of the CIM, and defining the second data of the second file as also including the second data block of the second region file of the CIM; and incrementing a reference count for the second data block;

wherein the second file definition replaces the first file definition within the metadata portion of the CIM, and the CIM after the replacement embodies a second directory hierarchy that is the same as the first directory hierarchy.

\*   \*   \*   \*   \*